United States Patent
Barbu et al.

(10) Patent No.: US 9,211,949 B2
(45) Date of Patent: Dec. 15, 2015

(54) AIRCRAFT WHEEL WITH A UNIVERSAL DRIVE DOG

(71) Applicant: MESSIER-BUGATTI-DOWTY, Velizy-Villacoublay (FR)

(72) Inventors: Mirca Barbu, Velizy-Villacoublay (FR); Sébastien Remond, Velizy-Villacoublay (FR)

(73) Assignee: MESSIER-BUGATTI-DOWTY, Velizy-Villacoublay (FR)

( * ) Notice: Subject to any disclaimer, the term of this patent is extended or adjusted under 35 U.S.C. 154(b) by 171 days.

(21) Appl. No.: 14/036,971

(22) Filed: Sep. 25, 2013

(65) Prior Publication Data

US 2014/0091173 A1    Apr. 3, 2014

(30) Foreign Application Priority Data

Oct. 1, 2012 (FR) ...................... 12 59295

(51) Int. Cl.
*B64C 25/40* (2006.01)
*B64C 25/36* (2006.01)
*B60B 21/12* (2006.01)
*B60B 37/04* (2006.01)

(52) U.S. Cl.
CPC ............... *B64C 25/405* (2013.01); *B60B 21/12* (2013.01); *B64C 25/36* (2013.01); *B60B 37/04* (2013.01); *B60B 2900/351* (2013.01); *B60Y 2200/51* (2013.01); *Y02T 50/823* (2013.01)

(58) Field of Classification Search
CPC ........ B60B 21/00; B60B 21/12; B60B 25/00; B64C 25/40; B64C 25/405; B64C 25/34; B64C 25/36
USPC .............................................. 301/6.1, 6.2, 6.5
See application file for complete search history.

(56) References Cited

U.S. PATENT DOCUMENTS

| | | | |
|---|---|---|---|
| 1,059,765 A | | 4/1913 | Rosenbaum |
| 1,378,494 A | | 5/1921 | Stenger et al. |
| 1,451,913 A | * | 4/1923 | Kokko ............ 301/29.2 |
| 2,129,807 A | * | 9/1938 | Beckman et al. ......... 301/12.1 |
| 2,338,699 A | | 1/1944 | Wilhoit et al. |
| 3,829,162 A | * | 8/1974 | Stimson et al. ............. 301/6.2 |
| 3,836,201 A | * | 9/1974 | Stimson et al. ............. 301/6.2 |
| 2011/0156472 A1 | * | 6/2011 | Bucheton et al. ............ 301/6.2 |
| 2013/0233969 A1 | * | 9/2013 | Charles et al. ............. 244/103 R |

FOREIGN PATENT DOCUMENTS

BE    628 456 A    5/1963
FR    1165699 A  * 10/1958

* cited by examiner

*Primary Examiner* — Kip T Kotter
(74) *Attorney, Agent, or Firm* — Sughrue Mion, PLLC

(57) ABSTRACT

An aircraft wheel comprising a rim adapted to receive a tire, and a hub connected to the rim (2) in order to receive bearings for guiding the wheel in rotation about an axis of rotation (X) on an axle of the aircraft. The wheel includes at least one dog (10) that projects laterally from the rim in order to present two parallel faces (11). The dog is pierced by an orifice (12) extending from one face to the other along a generally orthoradial direction (Y).

7 Claims, 3 Drawing Sheets

AIRCRAFT WHEEL WITH A UNIVERSAL DRIVE DOG

The invention relates to an aircraft wheel for being driven in rotation by a rotary drive member fitted to the landing gear that receives said wheel.

BACKGROUND OF THE INVENTION

Various rotary drive devices are presently under consideration for applying rotary drive to the wheels of aircraft landing gear, for the purpose of avoiding using the engines of the aircraft for taxiing on the ground. Frequently, a driver that rotates about the same axis of rotation as the wheel is set into rotation, the driver being secured to the wheel via one or more link members. For example, Document FR 2 954 752 illustrates an aircraft wheel being driven by a driver, specifically a toothed ring mounted to rotate about the brake, drive being delivered via resilient links that extend between the driver and the wheel.

OBJECT OF THE INVENTION

An object of the invention is to propose a wheel that can easily be coupled to a variety of rotary drive devices.

SUMMARY OF THE INVENTION

In order to achieve this object, there is provided an aircraft wheel comprising a rim adapted to receive a tire, and a hub connected to the rim in order to receive bearings for guiding the wheel in rotation about an axis of rotation on an axle of the aircraft. According to the invention, the wheel includes at least one dog that projects laterally from the rim in order to present two parallel faces and that is pierced by an orifice extending from one face to the other along a generally orthoradial direction.

The wheel can thus be driven merely via a fork secured to the driver and placed astride the dog of the wheel. The wheel can also be driven by a link coupled firstly to the driver and secondly to a lug fitted with a threaded shank that is inserted in the orifice in the dog and that is fastened thereto with the help of a nut. The wheel may also be driven by fitting a hook on the dog, which hook engages a catch secured to the driver, or by fitting a finger that is engaged by a fork of the driver.

Thus, the pierced dog makes it possible to provide drive in numerous ways, such that a wheel fitted with at least one such dog can be made available for use with aircraft landing gear that may be provided with a variety of drive members, providing they include drive means suitable for co-operating with at least one dog in order to drive the wheel in rotation.

BRIEF DESCRIPTION OF THE DRAWINGS

The invention can be better understood in the light of the following description of a particular embodiment given with reference to the figures of the accompanying drawings, in which.

DETAILED DESCRIPTION OF THE INVENTION

Figure 1:
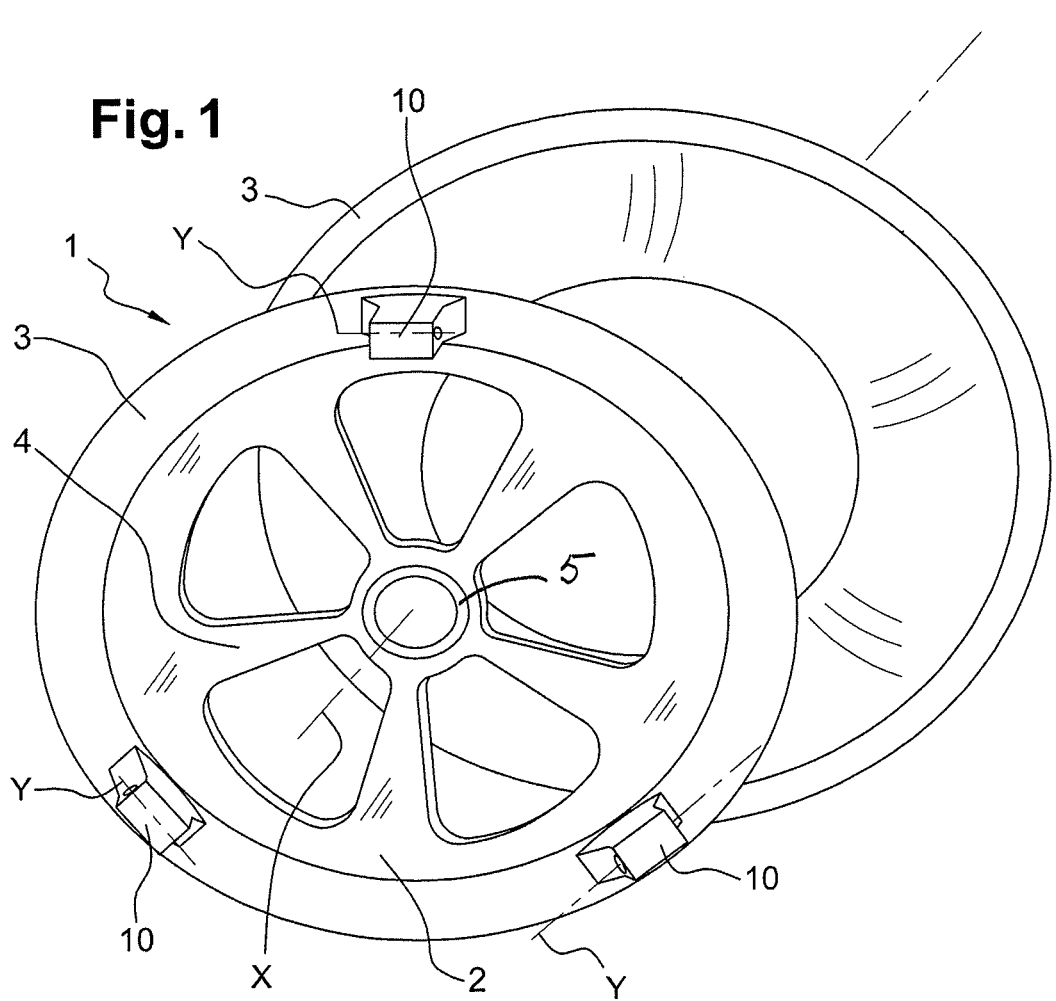
FIG. 1 is a perspective view of an aircraft wheel of the invention.

With reference initially to FIG. 1, the aircraft wheel 1 shown comprises a rim 2 with flanges 3 suitable for receiving a tire (not shown). The rim 2 is connected to a hub 5 by means of a web 4 in order to enable it to be mounted to rotate about an axis of rotation X on a landing gear axle or spindle. In this example, the wheel 1 is made in the form of an entire wheel with a separate flange that is assembled thereon by means of bolts. Nevertheless, the invention is not limited to a wheel of this type and is equally applicable to wheels of other types, e.g. to wheels made up of two half-wheels.

Figure 2:
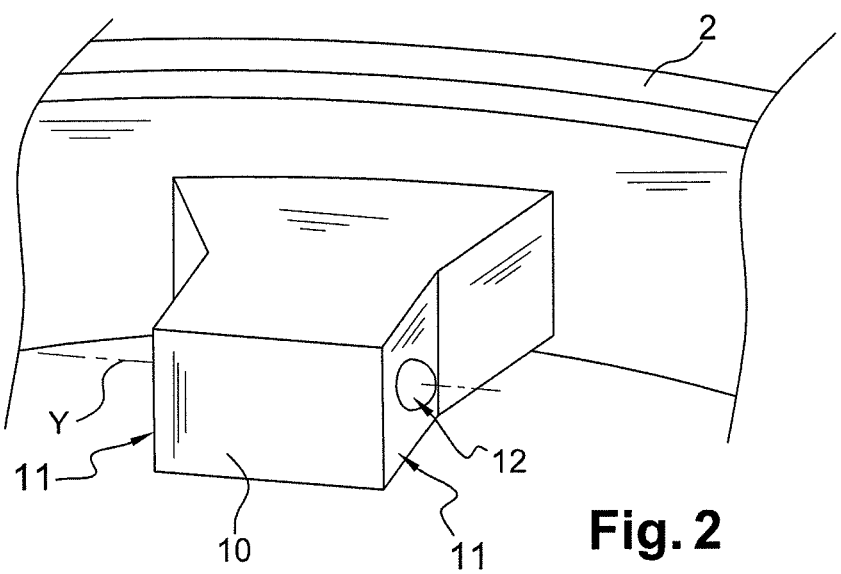
FIG. 2 is a detail view of one of the dogs of the FIG. 1 wheel.

In accordance with the invention, the wheel 1 in this example has three dogs 10 that project laterally from one side of the rim, being regularly distributed at 120° from one another. As can be seen in FIG. 2, each of the dogs 10 has parallel opposite faces 11, and it is pierced to present a through orifice 12 that extends in a generally orthoradial direction Y (i.e. in a direction perpendicular both to an axial direction and to a radial direction). The opposite faces 11 extend perpendicularly to the axis Y. The dogs 10 enable the wheel to be driven in rotation in numerous ways by a driver of a drive device fitted to the landing gear. In this example, for the purposes of illustration, the driver is a toothed wheel 100 mounted to rotate about the axis X while being guided at the periphery of the brake (not visible). The toothed wheel is set into rotation by an electric motor that is not shown.

Figure 3:
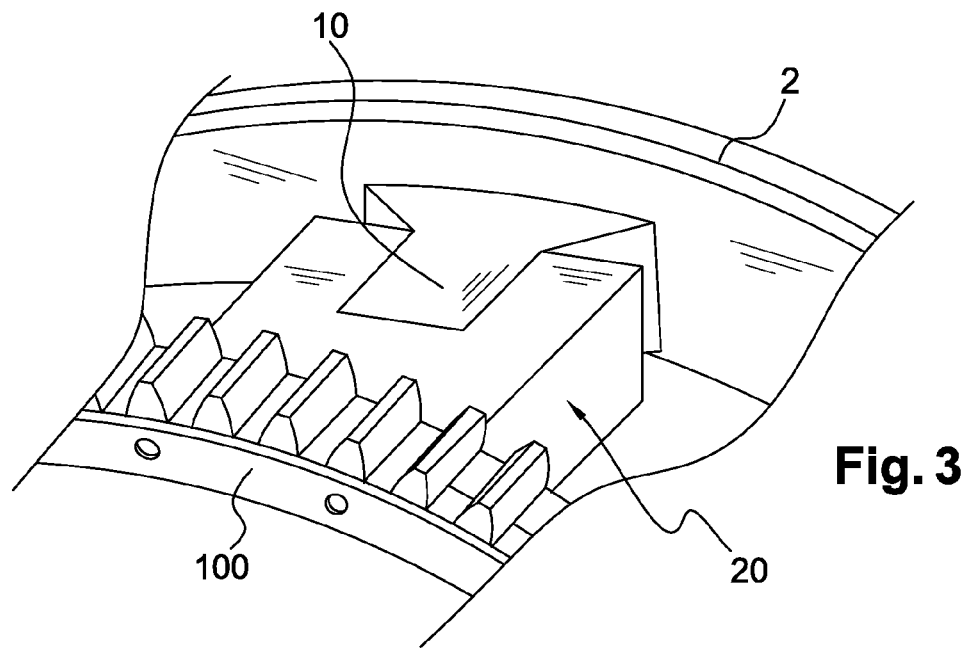
FIG. 3 is a detail view of the FIG. 1 wheel being driven by a driver with a fork.

In a first way of driving the wheel of the invention in rotation as shown in FIG. 3, the drive device comprises a driver 100 having one or more forks 20, each of which is placed astride a respective one of the dogs. Each of the forks 20 co-operates with the parallel faces 11 of the dog 10 in order to enable drive torque to be transmitted between the forks 20 and the dogs 10.

Figure 4:
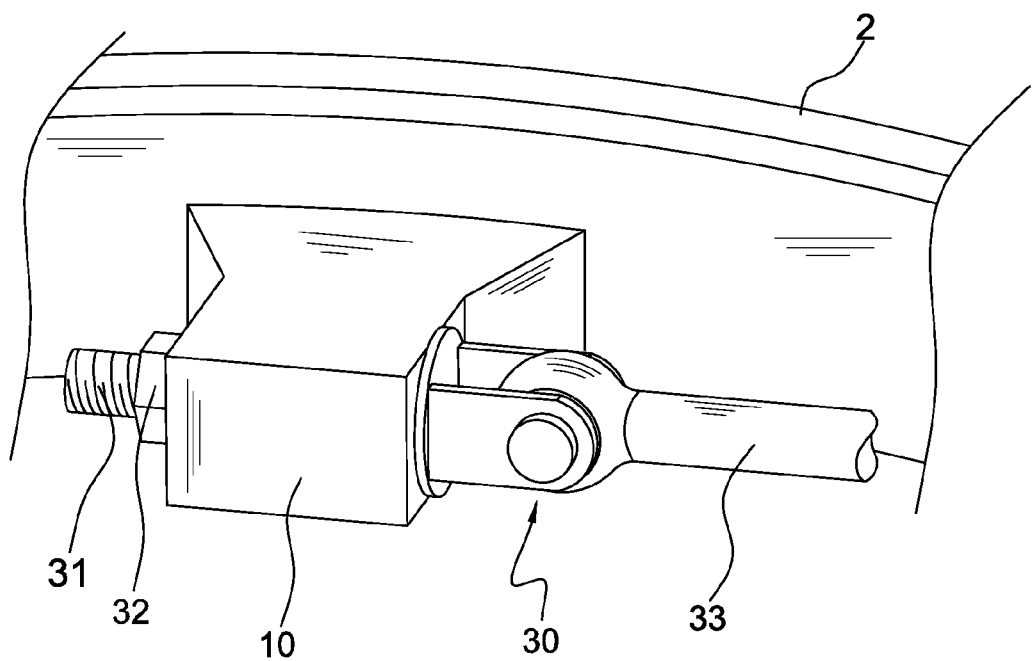
FIG. 4 is a detail view of the FIG. 1 wheel fitted with the lugs for coupling the wheel to a driver by means of links.

In a second way of driving the wheel of the invention in rotation, as shown in FIG. 4, the dogs 10 are fitted with pairs of lugs 30 that are associated with respective shanks 31, each having a threaded end that is suitable for inserting in the orifice 12 of one of the dogs 10. The lugs 30 are held against the dog 10 by means of a nut 32 screwed onto the end of the shank 31. The lugs as fitted in this way are used for coupling to the end of a link 33 that is also coupled to the driver.

Figure 5:
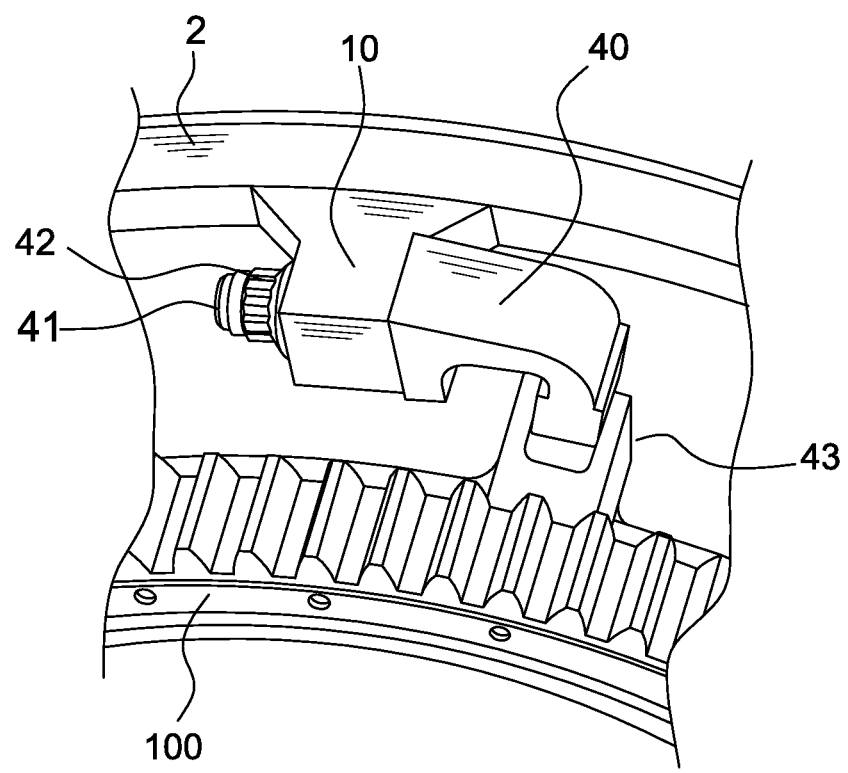
FIG. 5 is a detail view of the FIG. 1 wheel fitted with a hook for coupling the wheel to a driver by means of a fork.

In a third way of driving the wheel of the invention in rotation, as shown in FIG. 5, the dogs 10 are provided with hooked fingers 40 that are fitted on the dogs and that, in this example, have their ends engaged with forks 43 carried by the driver. In this example, the fingers 40 also have respective shanks 41 with threaded ends engaged in the orifices of the dogs 10 and held in place by nuts 42 screwed onto the ends of the shanks.

The invention claimed is:

1. A method of driving an aircraft wheel comprising a rim adapted to receive a tire, and a hub connected to the rim (2) in order to receive bearings for guiding the wheel in rotation about an axis of rotation (X) on an axle of an aircraft, the method comprising:

fitting the wheel with at least one dog (10) that projects laterally from the rim in order to present two parallel faces (11) and that is pierced by an orifice (12) extending from one face to the other along a generally orthoradial direction (Y); and providing the aircraft with a rotary drive member (100) provided with drive means (20; 33; 43) suitable for co-operating with at least one dog.

2. The method according to claim 1, including fitting the wheel with three dogs (10, 10, 10) that are circumferentially spaced apart at 120° from one another.

3. The method according to claim 1, wherein the rotary drive member is provided with one or more drive forks (20) suitable for fitting astride a respective dog in order to transmit rotary torque by the fork bearing against one of the parallel faces of the dog.

4. The method according to claim 1, wherein the rotary drive member (100) is provided with a drive link (33) having one end coupled to a lug (30) fitted to the dog (10).

5. The method according to claim 4, wherein the lug is fitted with a shank (31) having a threaded end, the shank being engaged in the orifice of the dog in order to fasten the lug to the dog by means of a nut.

6. The method according to claim 1, wherein the rotary drive member (100) is provided with a fork (43) that receives the end of a hooked finger (40) fitted on the dog (10).

7. The method according to claim 6, wherein the hooked finger is fitted with a shank (41) having a threaded end, the shank being engaged in the orifice of the dog in order to fasten the hooked finger to the dog by means of a nut.

\* \* \* \* \*